F. A. PICKETT.
AUTOMATIC GAS SHUT-OFF.
APPLICATION FILED FEB. 20, 1914.

1,132,115.

Patented Mar. 16, 1915.
3 SHEETS—SHEET 1.

Witnesses
Charles H. Trotter
H. Hazelhurst

Inventor
F. A. Pickett
By A. Randolph Jr.
Attorney

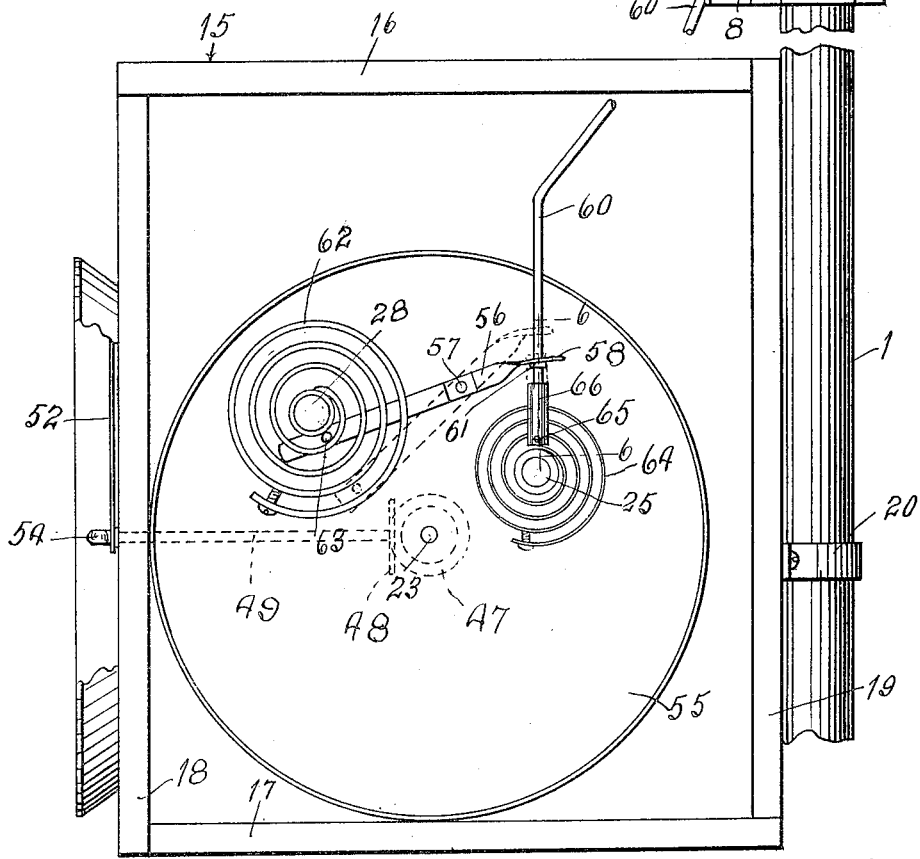

F. A. PICKETT.
AUTOMATIC GAS SHUT-OFF.
APPLICATION FILED FEB. 20, 1914.

1,132,115.

Patented Mar. 16, 1915.
3 SHEETS—SHEET 3.

Witnesses
Charles H. Trotter

Inventor
F. A. Pickett
By ___ Attorney

UNITED STATES PATENT OFFICE.

FREDERICK A. PICKETT, OF BALTIMORE, MARYLAND.

AUTOMATIC GAS SHUT-OFF.

1,132,115.   Specification of Letters Patent.   Patented Mar. 16, 1915.

Application filed February 20, 1914. Serial No. 820,038.

*To all whom it may concern:*

Be it known that I, FREDERICK A. PICKETT, a citizen of the United States, residing at Baltimore, in the State of Maryland, have invented certain new and useful Improvements in Automatic Gas Shut-Offs; and I do hereby declare the following to be a full, clear, and exact description of the invention, such as will enable others skilled in the art to which it appertains to make and use the same.

The primary object of this invention is to provide an automatic time controlled mechanism for operating gas cocks to shut off the flow of gas after a predetermined interval of time.

The invention is designed especially for use in connection with tank water heaters where a gas flame is utilized to heat the water and where it is usually desirable to have this flame burn only long enough to heat a definite quantity of water, such as ten, twenty, or thirty gallons.

My invention is of simple and practical construction and consists essentially of time controlled mechanism which may be set to operate after the gas has been burning any desired length of time and which releases a spring actuated stop cock, allowing said cock to close and cut off the flow of gas.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1:
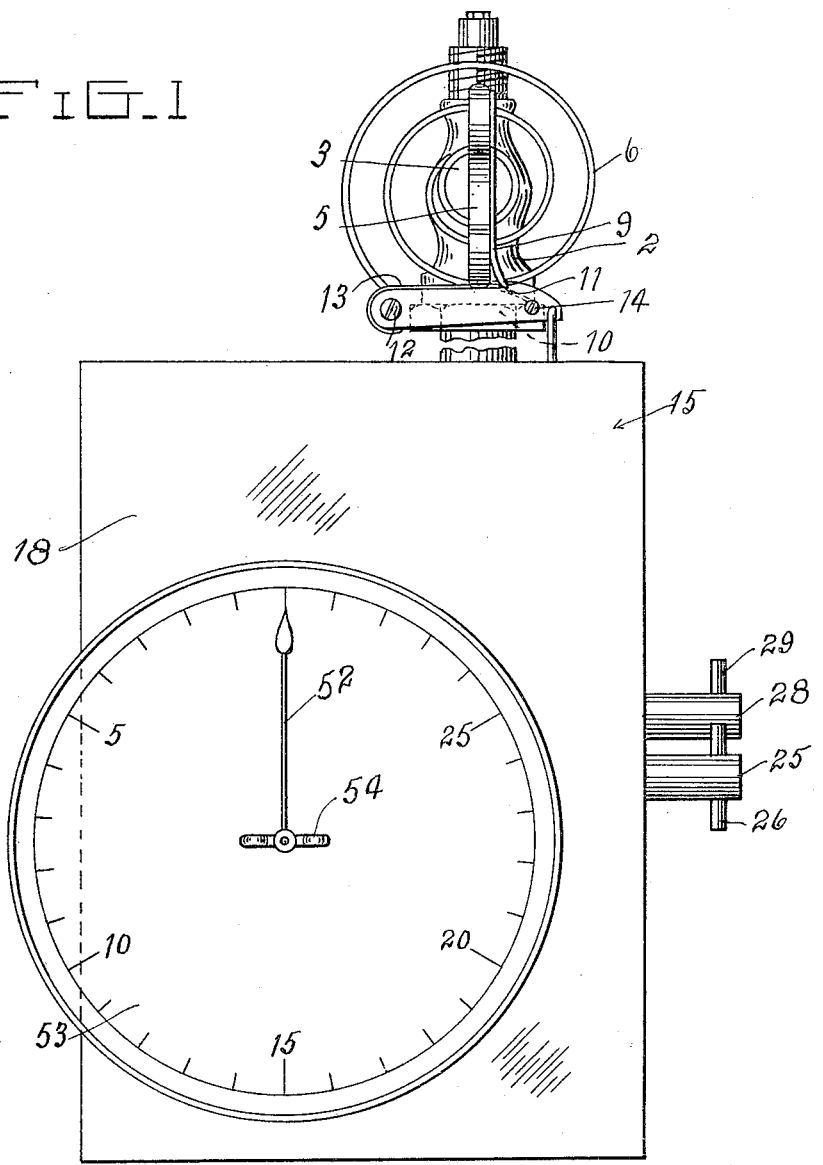
Figure 4:
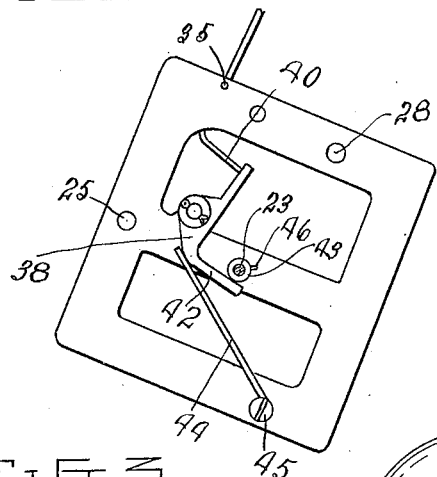
Figure 6:
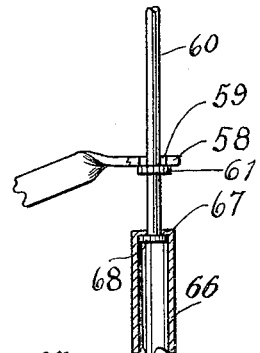
Figure 3:
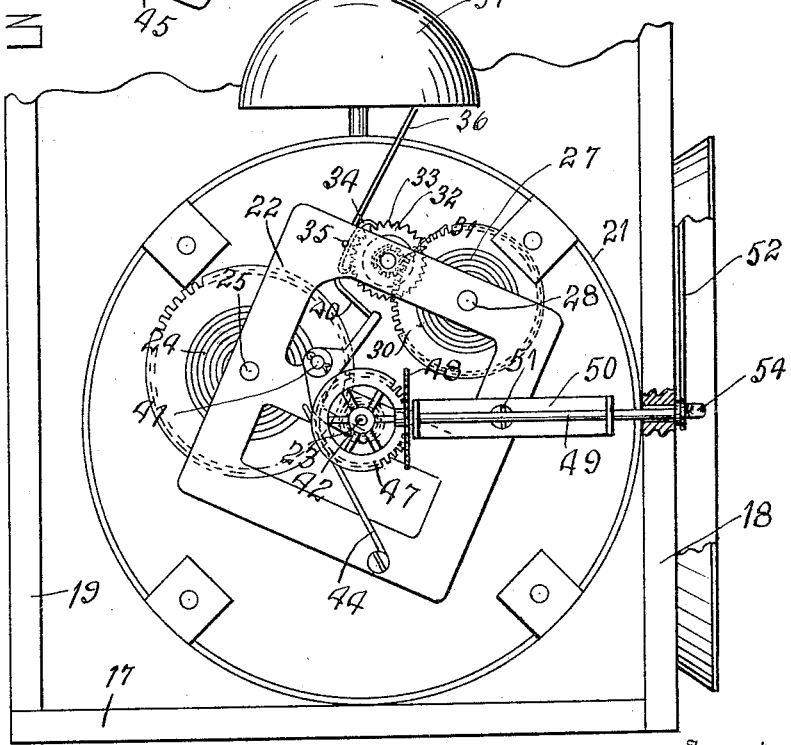

Figure 1 is a front elevation of the mechanism, showing the gas cock in its opened position. Fig. 2 is a side elevation of my automatic shut-off mechanism, showing the same in position after having released the spring actuated cock, Fig. 3 is a side elevation of the time releasing mechanism, Fig. 4 is a side elevation, illustrating the time controlled releasing mechanism, Fig. 5 is a detail perspective view of a member to be hereinafter more fully described, and Fig. 6 is an enlarged detail view, partly in section on the plane of line 6—6 of Fig. 2.

Referring in detail to the drawings by numerals, 1 designates a vertical gas pipe having a valve casing 2 secured to the upper end thereof in which operates a rotatable plug valve 3, having a port 4 which, when arranged in a horizontal plane, cuts off the flow of gas. The cock is provided on one end with a handle 5 by which it may be turned against the tension of the spring 6 into open position. One end of this spiral spring is secured to the valve, as indicated by the numeral 7, and the other end is secured to a bracket 8 connected to the valve casing 2, and the spring is so arranged as to hold the valve normally closed. A transverse plate 9 is secured to one side of the handle 5 adjacent its inner end, and when swung into a vertical plane, may be brought into locking engagement with a latch 10, having an inwardly facing shoulder 11. The latch is pivotally secured at one end to the bracket 8 by a suitable pivotal connection 12 and is held normally in a raised position by a wire spring 13 connected at one end to the bracket and at its other or outer end to the latch by a suitable fastener 14. When the latch 10 is in its normal raised position, the plate 9 may be engaged lockingly with the shoulder 11 by turning the cock in a clockwise direction against the tension of the spring 6.

The time controlled trip and alarm mechanism is housed within a casing 15 of any suitable construction, having a top wall 16, bottom wall 17, front wall 18 and rear wall 19, the latter carrying a strap 20 which encircles the pipe 1. Of course it will be understood that any means other than the strap 20 may be provided for supporting or securing the casing in proper position below the valve. The time controlled mechanism is a modified form of the ordinary clock mechanism and hence only those parts thereof which differ from the standard clock construction will be described in detail. Within the cylindrical casing 21 is secured a frame 22 which supports the modified clock mechanism. This mechanism includes a main shaft 23 which corresponds to one of the hand carrying shafts of a clock, and having an ordinary friction clutch, (not shown) and which is driven by the usual coil spring 24 and escapement gears and mechanisms which it is not thought necessary to illustrate as they are identical with that of the ordinary clock.

The main spring 24 is secured to a winding shaft 25 which projects rearwardly through the case 15 and carries a turning handle 26.

The alarm mechanism comprises a coil spring 27 secured at one end to a winding shaft 28 which may be turned by a pin or handle 29. The spring, in unwinding drives through the medium of the gears 30 and 31 an escapement wheel 32, the teeth 33 of which oscillate a pallet 34 rigidly secured to a shaft 35. A clapper 36 is also rigidly secured to the shaft 35 and, when actuated, rings a bell 37, as will be clearly understood. The pallet 34 may be locked against movement by an oscillatory plate 38 having an inwardly projecting finger 39 to engage an arm 40 secured to the shaft 35. When the finger 39 is swung into the path of the arm 40, the latter is held against movement, thus holding the pallet 34 stationary and stopping the escapement wheel 32. The plate 38 is mounted on a stud 41 carried by the frame 22 and carries an arm 42 which extends into engagement with a collar 43 carried on the the shaft 23. A spring 44 is secured at one end to the frame 22 by the fastener 45 and forces the arm 42 toward the collar 43, and when this arm is in engagement with the collar, the finger 39 is located in the path of the arm 40.

The collar 43 is provided with a pin 46 and when this pin is carried by the rotation of the shaft 23 into engagement with the arm 42, the latter is swung away from the shaft to bring the finger 39 from the path of the arm 40.

The shaft 23 drives through the medium of suitable gears 47 and 48, and indicator shaft 49 journaled through a U-shaped bracket 50 connected to the frame 42 by a screw 51. The shaft 49 projects at right angles to the shaft 23 and extends through the front wall 18 of the case 15. A pointer 52 is rigidly secured to the shaft 49 adjacent its outer end, and swings around a dial plate 53 which is graduated to indicate gallons. The shaft 49 may be manually turned to position the pointer at any place desired by a wing nut 54 secured to its outer end.

To the side wall 55 of the case 21, a lever 56 is pivotally secured by a suitable fastener 57. The pivot point is intermediate the shafts 25 and 28 and the lever extends over the former and under the latter. It is preferably formed of flat metal and has its outer end portion turned through an angle of ninety degrees, as indicated by the numeral 58, and formed with an aperture 59. A connecting rod 60 extends from the free end of the latch 10 downwardly through the opening 59 and carries a collar 61 which is positioned under the lever 56 to be engaged thereby. It will be apparent that when the outer turned end of the lever is swung downwardly, the connecting rod will be pulled downwardly to disengage the latch 10 from the plate 9 of the spring pressed cock.

The lever 56 is actuated by a spiral cam 62 rigidly secured to the shaft 28 of the alarm mechanism. The cam is formed by coiling a strip of flat metal spirally and the lever 56 carries a laterally projecting pin 63 which projects into the coils of the cam, so that as the latter is rotated, the pin will be moved toward or away from the shaft 28, the direction being dependent upon the direction of rotation. When the alarm goes off, the cam 62 rotates in a clockwise direction and draws the pin 63 to the position shown in Fig. 2, causing the outer end thereof to be swung downwardly and lower the connecting rod 60 to release the pawl 10 from the plate 9.

The shaft 25 of the main spring 24 is provided with a spiral cam 64 which moves a pin 65 rigidly secured to a tube 66. The connecting rod 60 extends into the top of the tube through an opening 67 and carries a collar 68 which is engaged by the upper end wall of the tube when the main spring is completely unwound.

Having described the construction of my automatic shut-off mechanism, I will now explain the operation thereof: Supposing the main spring 24 and the alarm spring 27 to be wound, the lever 56 would then be in the position, shown by the dotted lines in Fig. 2. If it be desired to have the gas burn long enough to heat, for example, ten gallons of water, the wing nut or handle 54 is turned to rotate the shaft 49 and bring the pointer 52 to the tenth graduation. This rotation of the shaft 49 turns the shaft 23 through the medium of the gears 47 and 48 to swing the pin 46 into about the position shown in Fig. 4. The gas cock 4 is then turned to its open position, bringing the plate 9 into locking engagement with the elevated pawl 10. The clock mechanism actuated by the spring 24, will slowly revolve the shaft 23 in a clockwise direction, and when the shaft has been turned to bring the pointer 52 to zero position, the pin 46 will have engaged the arm 42 of the oscillatory plate 38, swinging the finger 39 of said plate from the path of the arm 40. This movement of the plate 38 releases the alarm mechanism, so that the bell 37 is sounded and the spring 27 allowed to rapidly uncoil which turns the shaft 28 and therefore the cam 62 rigid therewith. The cam turns in a clockwise direction, causing the outer end of the lever 56 to swing downwardly into engagement with the collar 61 and pull the connecting rod 60 downwardly to swing the pawl 10 from engagement with the plate 9.

From the foregoing it will be apparent that I have provided a simple time operated mechanism for releasing a spring actuated valve after any predetermined interval of time has elapsed. After each operation of the alarm and release mechanism, it is necessary to rewind the spring 27 to allow the spring pressed latch 10 to return to its normal position, said movement being possible only when the cam 62 is turned so as to raise the free end of the lever 56. The cam 64 prevents the cock being locked in open position when the main spring is completely unwound by drawing the tube 66 downwardly against the collar 68 and lowering the connecting rod 60.

While I have shown and described the preferred embodiment of my invention, it will be understood that minor changes in construction and arrangement of parts may be made without departing from the scope and spirit of the invention as claimed. It is to be also understood that the time mechanism may be employed for purposes other than the one specifically referred to and illustrated.

Having thus described my invention, I claim:—

1. In a valve operating device, the combination of a lock member, a lock releasing lever, a connecting rod, said lock releasing lever being connected with the connecting rod, said connecting rod being connected with the lock member, to move the latter to inoperative position upon the operation of the releasing lever, and means for locking the connecting rod against movement in one direction.

2. In a valve operating device, the combination of a valve engaging lock member, a depending rod connected with said lock member, a lever connected with said rod for drawing the latter in one direction to move the lock member to inoperative position, and means for locking said rod against movement in the reverse direction.

3. In a valve operating device, the combination of a lock member, means for resiliently retaining said lock member in operative position, a rod connected with said lock member for moving the latter to inoperative position, means for moving the rod in one direction, a time train including a main spring, and means controlled thereby for preventing the return of the rod and lock member toward normal position when the main spring is substantially run down.

4. In a time controlled valve operating device, a time train including a main spring and arbor, a cam thereon, an alarm train including an alarm arbor, means controlled by the time train for releasing the alarm train, a cam on the alarm arbor, a valve controlling rod, a lever connected with said valve controlling rod and operated normally by the cam on the alarm arbor, the rod being controlled by the cam on the main spring arbor for preventing movement toward setting position of the valve controlling rod when the main spring is substantially unwound.

5. In a time controlled valve operating device, a time train including a main spring and arbor, an alarm train including an alarm arbor, means controlled by the time train for releasing the alarm train, a valve controlling rod operated normally by the alarm arbor, and means controlled by the main spring arbor for preventing movement toward setting position of the valve controlling rod when the main spring is substantially unwound.

In testimony whereof I affix my signature in presence of two witnesses.

FREDERICK A. PICKETT.

Witnesses:
H. B. PICKETT,
JOHN F. WARNER.

Copies of this patent may be obtained for five cents each, by addressing the "Commissioner of Patents, Washington, D. C."